US006289791B1

(12) United States Patent
Henriksen

(10) Patent No.: US 6,289,791 B1
(45) Date of Patent: Sep. 18, 2001

(54) ARRANGEMENT IN A COMBUSTION ENGINE WITH INTERNAL COMBUSTION

(75) Inventor: Leif Dag Henriksen, Skein (NO)

(73) Assignee: Sinus Holding AS, Breivik (NO)

( * ) Notice: Subject to any disclaimer, the term of this patent is extended or adjusted under 35 U.S.C. 154(b) by 0 days.

(21) Appl. No.: 09/420,630

(22) Filed: Oct. 20, 1999

Related U.S. Application Data

(62) Division of application No. 09/319,034, filed as application No. PCT/NO98/00126 on Apr. 22, 1998.

(30) Foreign Application Priority Data

Apr. 25, 1997 (NO) ........................................ 971907

(51) Int. Cl.[7] ........................................ F16J 1/04
(52) U.S. Cl. ........................ 92/187; 92/208; 123/193.6
(58) Field of Search ........................ 92/187, 188, 238, 92/208; 123/103 P

(56) References Cited

U.S. PATENT DOCUMENTS 5,601,010 * 2/1997 Sawada et al. ........................ 92/22

* cited by examiner

*Primary Examiner*—Edward K. Look
*Assistant Examiner*—Michael Leslie
(74) *Attorney, Agent, or Firm*—Francis C. Hand, Esq.; Carella Byrne Bain Gilfillan Cecchi & Olstein

(57) ABSTRACT

The piston is provided with a hollow space in which a head member for a piston rod is mounted. A disc is provided within the piston for seating of the head member via mating concave/convex surfaces and a separate support ring is disposed under a flange of the head member with mating concave/convex surfaces therebetween. An annular clamping member serves to secure the disc ring and head member together and also abuts against an internal shoulder within the piston. Eccentric loadings on the piston are compensated by tilting movements between the head member and piston in a self-adjusting manner.

9 Claims, 3 Drawing Sheets

ARRANGEMENT IN A COMBUSTION ENGINE WITH INTERNAL COMBUSTION

This application is a division of pending U.S. patent application Ser. No. 09/319,034 filed May 28, 1999, which is a 371 of PCT/No98/00126 filed Apr. 22, 1998.

This invention relates to a piston and piston rod assembly.

As is known, pistons are usually mounted within a cylinder in a reciprocating manner to move back and forth to accomplish various purposes. In many cases, the piston is connected to a piston rod which, in turn, is connected to a motive source for reciprocating the piston within the cylinder. Typically, in an internal combustion engine, the piston has been connected in a hinged relationship with the piston rod in order to permit a relative movement between the piston and the piston rod, for example, where the piston rod is driven off a crank arm assembly or the like and does not move in a rectilinear path with the piston.

In cases where a piston and piston rod have been mutually connected for reciprocating movements in a rectilinear path within an associated cylinder, the connections tend to be rigid. However, a general problem which arises in these cases is that there is wear and tear not only on the outer side faces of the piston but also on the interior surfaces of the associated cylinder during use.

Accordingly, it is an object of the invention to reduce or avoid frictional resistance between the outside sliding surface of a piston and the interior sliding surface of an associated cylinder.

It is another object of the invention to reduce the tendency of wear and tear between a reciprocating piston and a cylinder during rectilinear movement of the piston.

Briefly, the invention is directed to a piston and piston rod assembly which allows restricted relative movements of a piston and a piston rod during their common rectilinear movements, for example, in a cylinder in order to allow the piston and the piston rod to be adjusted in a correct mutual support position during operation. The restricted relative movements, i.e. restricted pivotal movements, allow a self-adjustment of the piston at a head portion of the piston rod during use. This self-adjustment, in turn, provides for an automatic correct support position between the piston and the head portion along opposed, rounded off, i.e. concave cylindrical and convex cylindrical support surfaces, in order to secure an accurate concentric transfer of loads between the piston and the piston rod.

Basically, the piston is constructed with a cap portion and an annular skirt portion to define a hollow space. The piston rod includes a head member which is disposed axially within the hollow space of the piston and is provided with a convexly rounded top surface in mating engagement with a concave support surface in the piston as well as a concavely rounded bottom surface in mating engagement with a convex support surface in the piston. In addition, a clamping member is provided to secure the head member in the piston.

It is advantageous that the piston rod head member be located between a pair of opposed, separate, support members and that the support members are supported against the piston cap portion and the clamping member.

By employing a disc as a separate support member between the cap portion of the piston and head member of the piston rod, it is possible to also adjust the support member radially relative to the piston cap portion and relative to the clamping member.

It is further advantageous that the piston rod head member be provided with an annular flange portion extending radially outwards therefrom and a transition portion extending radially inwards therefrom and that the top convex surface be incorporated in the transition portion and that the bottom concave surface be incorporated in the underside of the flange portion.

Loads transferred from piston to piston rod, and vice versa, are substantially transferred centrally of the piston and the piston rod. However, eccentric loads acting on the piston rod flange portion will automatically cause an adjustment of the piston and piston rod into correct concentric positions.

These and other objects and advantages of the invention will become more apparent from the following description taken in conjunction with the accompanying drawings wherein.

Figure 1:
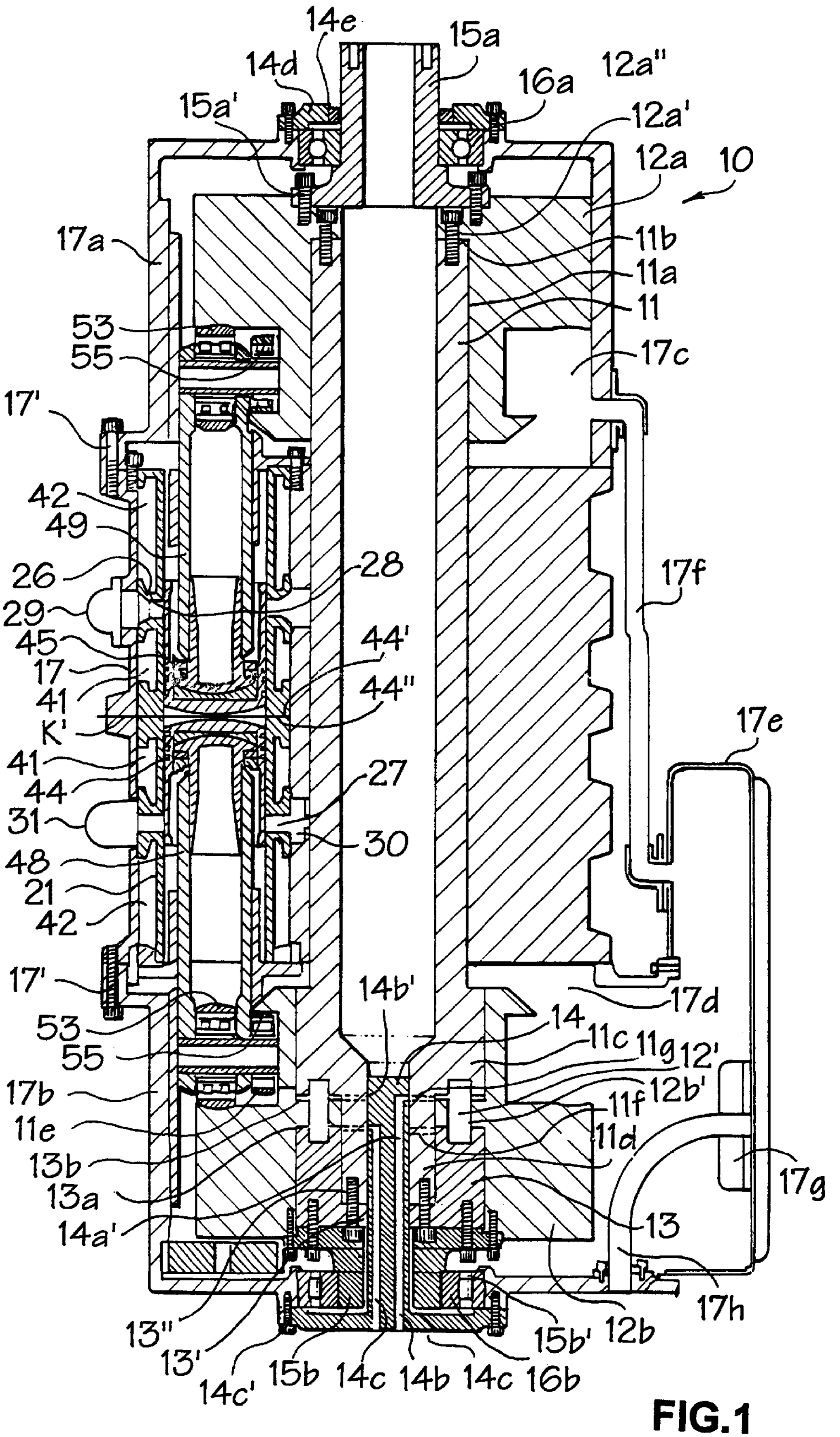
FIG. 1 illustrates a vertical sectional view through an internal combustion engine in which a piston and piston rod assembly in accordance with the invention is employed.
Figure 3:
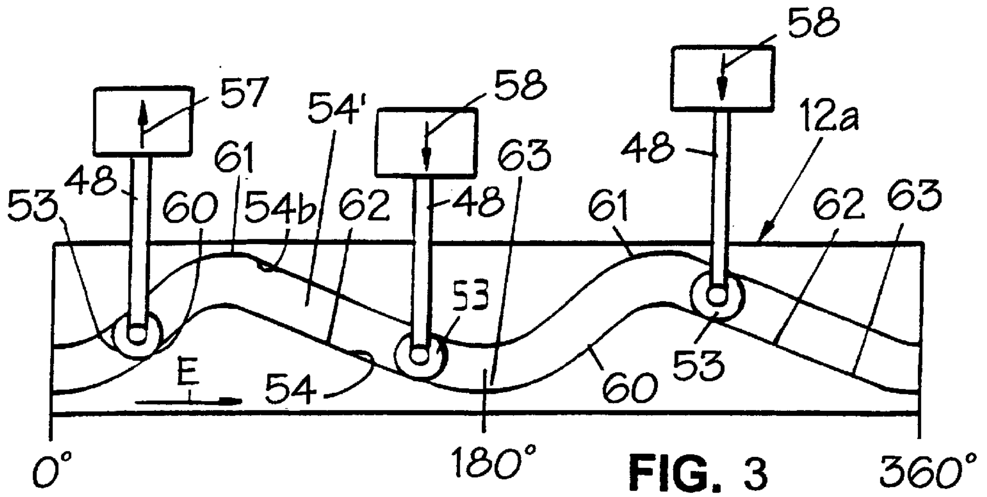
Figure 4:
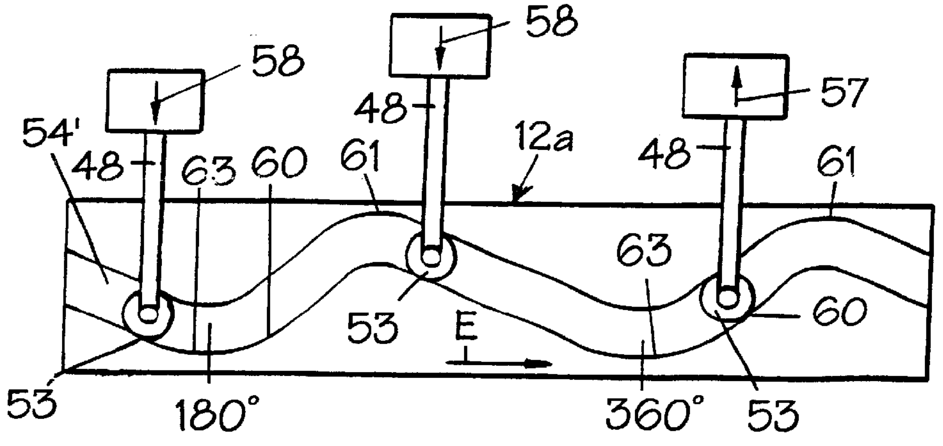
Figure 5:
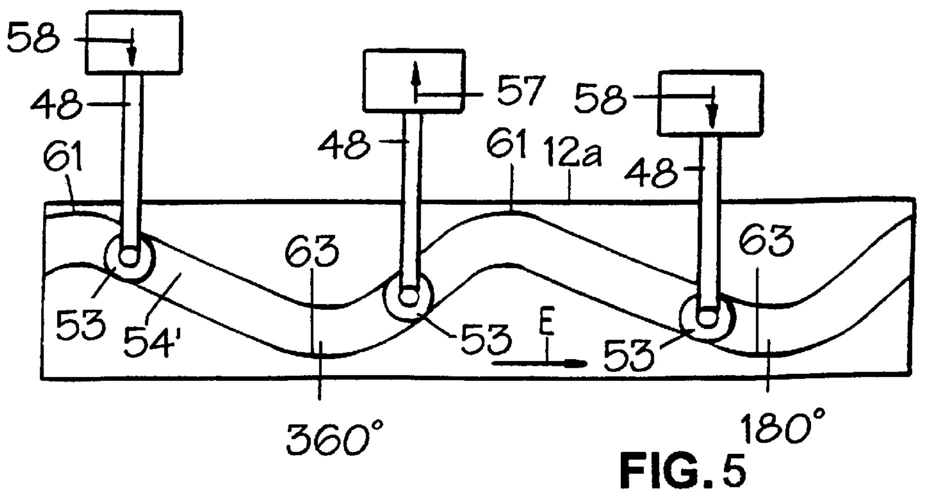

FIG. 3 schematically illustrates a general pattern of movement for one of the two pistons associated with each cylinder of a three cylinder engine in accordance with FIG. 1;

FIG. 4 illustrates a view similar to FIG. 2 at a later point in time of an engine cycle;

FIG. 5 illustrates a view similar to FIGS. 2 and 3 at a still later point in time of an engine cycle:

Referring to FIG. 1, the internal combustion engine 10 is specifically described in copending application Ser. No. 09/319,035 now Pat. No. 6,202,605 and a further description is not believed to be necessary herein. As illustrated, the internal combustion engine 10 has a drive shaft 11 disposed on a central axis and passing through an engine block 17 in which a plurality of cylinders are disposed about the drive shaft 11. Each cylinder contains two reciprocating pistons 44, 45 which are disposed in opposition to each other about a working chamber K' and each is connected to a piston rod 48, 49.

Each piston rod 48, 49 carries a ball bearing or caster 53 at one end which rolls on a contoured cam surface of a cam guide device 12*a*, 12*b*.

The contoured cam surface of each cam guide device 12*a*, 12*b* forms a "sine" curve as is particularly described in the parent application noted above.

Generally, the series arranged cylinders of the engine, with associated pistons, of the illustrated embodiment are arranged in specific angular positions around the axis of the drive shaft, for instance with mutually equal intermediate spaces along the sine plane or along the series of sine planes (the sine curve).

For example, for a two cycle or four cycle engine numbering three cylinders (see FIG. 3), there can be employed for each 360° revolution, two sine tops (crests) and two sine bottom (troughs) and four oblique surfaces lying between, that is to say, two sine planes are arranged after each other in each cam guide device 12*a*, 12*b*. Consequently, in a four cycle motor, four cycles can be obtained for each of the two pistons of the three cylinders with each revolution of the drive shaft/cam guide devices and four cycles for each of the two pistons of the three cylinders in a two-cycle engine.

Correspondingly, for a two-cycle engine numbering five cylinders, there can be employed, for each 360° resolution, a sine curve with two sine tops (crests) and two sine bottoms (troughs) and four oblique surfaces lying between, that is to say, two sine planes arranged after each other in each cam guide device 12*a*, 12*b* so that in a two-cycle engine four cycles are obtained for each of the two pistons of the five cylinders with each revolution.

The support rollers of the pistons 44, 45 are placed in the illustrated embodiment with equivalently equal angular intermediate spaces, that is to say in equivalent rotary angular positions along the sine curve, so that they are subjected one after the other to equivalent piston movements in equivalent positions along the respective sine planes.

FIG. 3 schematically shows the mode of operation of a three-cylinder engine 10. One piston 44 is shown of the two cooperating pistons 44, 45 in a planar spread condition along an associated sine curve 54' which consists of two mutually succeeding sine planes, plus the associated main caster 53 of the associated one piston rod 48. FIGS. 3, 4 and 5 schematically show the associated one piston 44 in each of three cylinders 21 of the engine, an equivalent arrangement being employed for the piston 45 at the opposite end of the cylinders. For the sake of clarity, the cylinder 21 and the opposite piston 45 have been omitted from FIGS. 3 to 5 only the piston 44, its piston rod 48 and its main caster 53 being shown. Axial movements of the piston 44 are illustrated by an arrow 57, which marks the compression stroke of the piston 44, and an arrow 58, which marks the expansion stroke of the piston 44.

Figure 2:
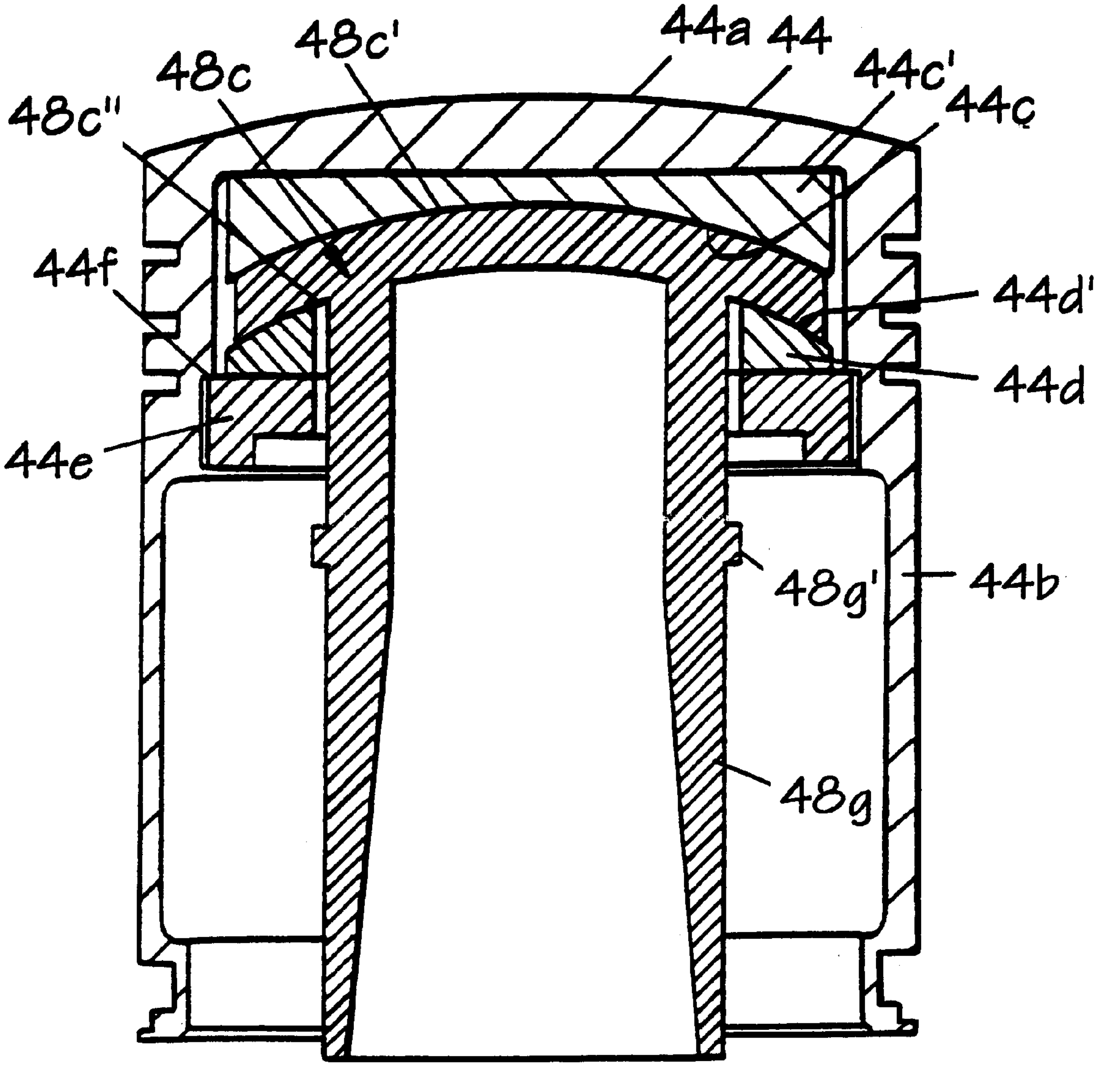
FIG. 2 illustrates a cross-sectional view of a piston and piston head arrangement in accordance with the invention.

Referring to FIG. 2, each piston 44 is mounted in the same fashion on a head member 48*c* so that the description of one arrangement shall be sufficient for all arrangements. As illustrated, the piston 44 is in the form of a relatively thin-walled cap having a cap portion 44*a* and an annular skirt portion 44*b* which together define a hollow space. A support member in the form of a disc 44*c* is disposed within the piston 44 in abutment with the cap portion 44*a* and is spaced, as shown, from the surrounding annular wall of the cap portion 44*a* so as to be radially movable relative thereto. The disc 44*c* also has a concave support surface 44*c*' facing in a direction away from the cap portion 44*a*.

The head member 48*c* for a piston rod (not shown) is disposed within the piston 44 and has a convex surface 48*c*' in mating, sliding engagement with the concave support surface 44*c*' of the disc 44*c*. The head member 48*c* also includes a flange which has a concave surface 48*c*" on the underside, as viewed, facing away from the disc 44*c*.

As illustrated, the head member 48*c* is provided with a sleeve-shaped carrying portion 48*g* which has rib portions 48*g*' projecting laterally outwardly to form a locking engagement with mating cavities (not shown) internally in an associated piston rod 48 (see FIG. 1).

A support ring 44*d* is disposed coaxially of and about the sleeve-shaped portion 48*g* of the head member 48*c* and includes a convex support surface 44*d*' in mating, sliding engagement with the concave surface 48*c*" of the flange of the head member 48*c*.

Still further, a clamping member in the form of an annular clamping ring 44*e* is disposed coaxially of and about the head member 48*c* in abutting relation to the support ring 44*d* as well as to a shoulder 44*f* on the piston cap portion in order to secure the head member 48*c* between the disc 44*c* and the support ring 44*d* whereby the piston 44 and head member 48*c* are movable laterally relative to each other. The head member 48*c* is consequently adapted to be tilted about a theoretical axis relative to the piston 44 controlled by the support surfaces 44*c*' and 44*d*'. By abutment against the shoulder portion 44*f* internally within the piston 44, the clamping ring 48*e* provides for the head member 48*c* and, thereby, the piston rod 48, to have a certain degree of fit and thereby a certain possibility of turning about the theoretical axis of the piston 44 during operation.

The piston 44 and the head member 48*c* on the piston rod 48 are capable of moving relative to each other with two degrees of freedom. That is to say, the piston 44 and the head member 48*c* are free to move laterally in all radial directions guided by the planar support surfaces at the internal face of the piston top portion and at the clamping face of the clamping ring 44*e* and by pivoting between the disc 44*c* and support ring 44*d*.

The invention thus provides an arrangement in which the wear and tear between a reciprocating piston and cylinder can be reduced particularly where the piston is driven by a reciprocating piston rod in a common cylinder.

The invention further provides an arrangement whereby self-adjustments may be made between a piston and a driving head member during a reciprocating motion of the piston and head member relative to a cylinder in which the piston and head member reciprocate along a common axis. In this respect, imposition of eccentric loads on the piston or the head member can be readily compensated without creating wear and tear on the piston or cylinder in which the piston is mounted.

What is claimed is:

1. In a piston and piston rod assembly, the combination comprising a piston having a cap portion and an annular skirt portion defining a hollow space;

a head member for a piston rod disposed coaxially within said hollow space of said piston, said head member having a convexly rounded top surface in mating engagement with a concave support surface in said piston, said head member having a concavely rounded bottom surface in mating engagement with a convex support surface in said piston; and a clamping member securing said head member in said piston.

2. The combination as set forth in claim 1 further comprising a disc between said cap portion of said piston and said head member, said disc having said concave support surface thereon.

3. The combination as set forth in claim 2 further comprising a support ring between said head member and said clamping member, said ring having said convex support surface thereon.

4. The combination as set forth in claim 3 wherein said head member includes a sleeve-shaped carrying portion for securement to a piston rod and an annular flange having said support surfaces thereon, said flange being disposed between said disc and said ring.

5. The combination as set forth in claim 1 wherein said head member includes a sleeve-shaped carrying portion for securement to a piston rod and an annular flange having said support surfaces thereon.

6. In a piston and piston rod assembly, the combination comprising a piston having a cap portion and an annular skirt portion defining a hollow space;

a disc within said piston in abutment with said cap portion and having a concave support surface thereon;

a head member for a piston rod disposed within said piston, said head member having a convex surface in mating sliding engagement with said concave support surface of said disc and a flange having a concave surface facing away from said disc;

a support ring coaxially of and about said head member, said ring having a convex support surface in mating sliding engagement with said concave surface of said flange of said head member; and an annular clamping member coaxially of and about said head member in abutting relation to said support ring and said piston to secure said head member between said disc and said support ring whereby said piston and said head member are movable laterally relative to each other.

7. The combination as set forth in claim 6 wherein said head member includes a sleeve-shaped carrying portion for securement to a piston rod.

8. The combination as set forth in claim 6 wherein said convex surface of said head member extends to over said flange.

9. The combination as set forth in claim 6 wherein said cap portion of said piston has an internal shoulder abutting said clamping member.

* * * * *